United States Patent [19]
Hearold et al.

[11] 4,392,184
[45] Jul. 5, 1983

[54] ILLUMINATING METHOD AND APPARATUS FOR CARPENTER'S OR MECHANIC'S LEVELS

[76] Inventors: Owen E. Hearold; Harvey G. Bennett, both of P.O. Box 1065, Minden, Nev. 89423

[21] Appl. No.: 236,333

[22] Filed: Feb. 20, 1981

[51] Int. Cl.³ .............................................. F21V 33/00
[52] U.S. Cl. .................................. 362/101; 362/109; 362/119; 362/120; 362/32
[58] Field of Search ............... 362/101, 109, 119, 120, 362/32

[56] References Cited
U.S. PATENT DOCUMENTS
1,818,843  8/1931  Dill ..................................... 362/109
3,114,507  12/1963  Dommer ............................ 362/109

Primary Examiner—Stephen J. Lechert, Jr.
Attorney, Agent, or Firm—Herbert C. Schulze

[57] ABSTRACT

This invention is a unique method and apparatus for illuminating carpenter's and mechanic's levels so that true readings may be obtained and the like, in shaded areas or under poor lighting conditions. The method and apparatus are characterized by the insertion of an illuminating device into the level in such manner that illumination travels through the leveling medium eliminating shadows normally caused. The invention includes the method for insertion within existing levels.

5 Claims, 15 Drawing Figures

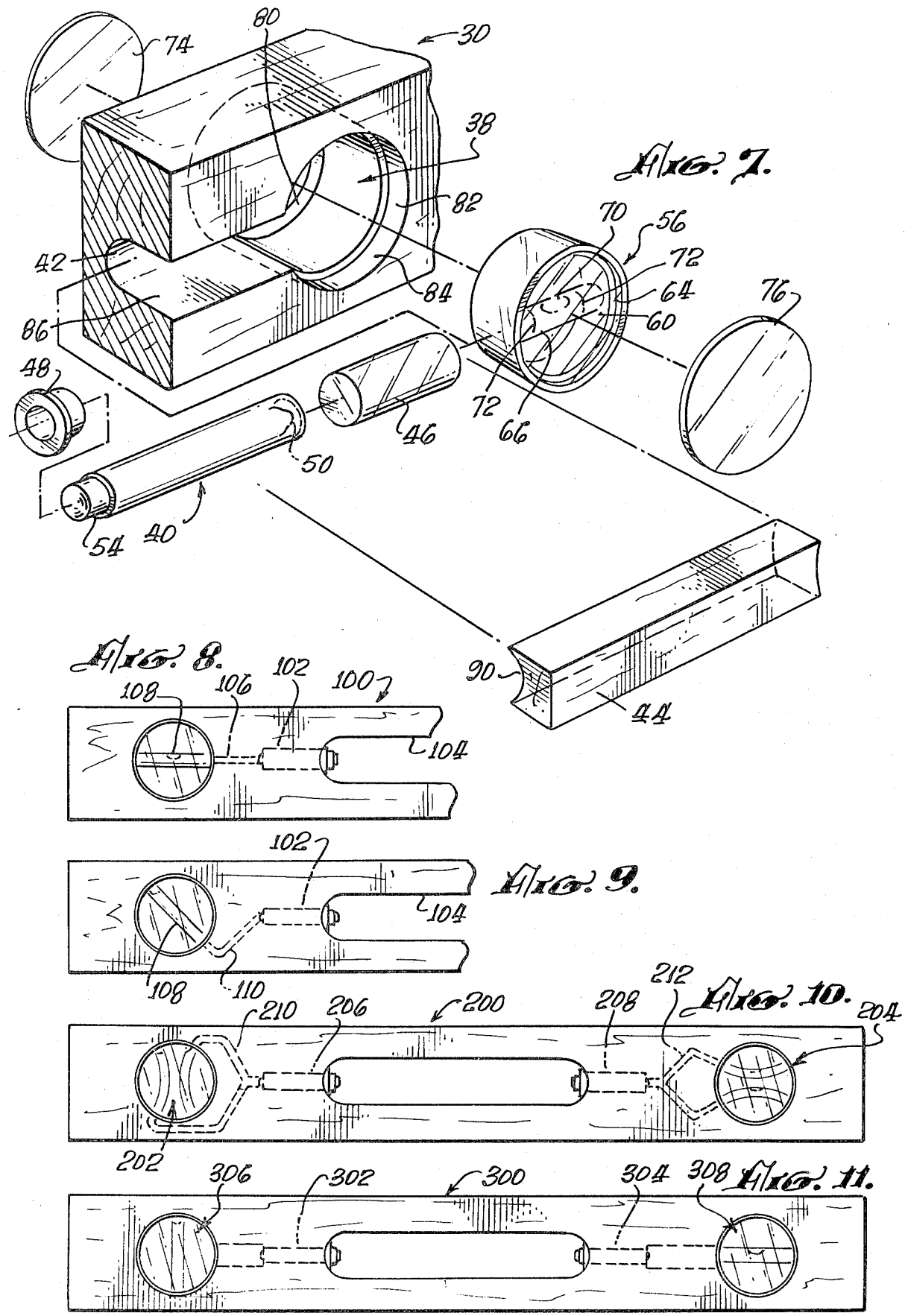

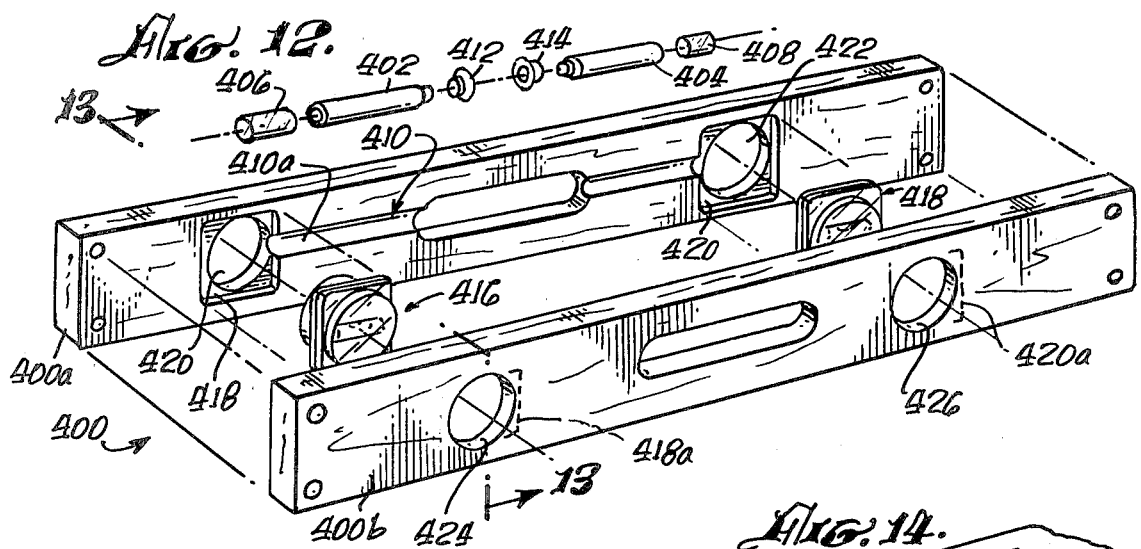
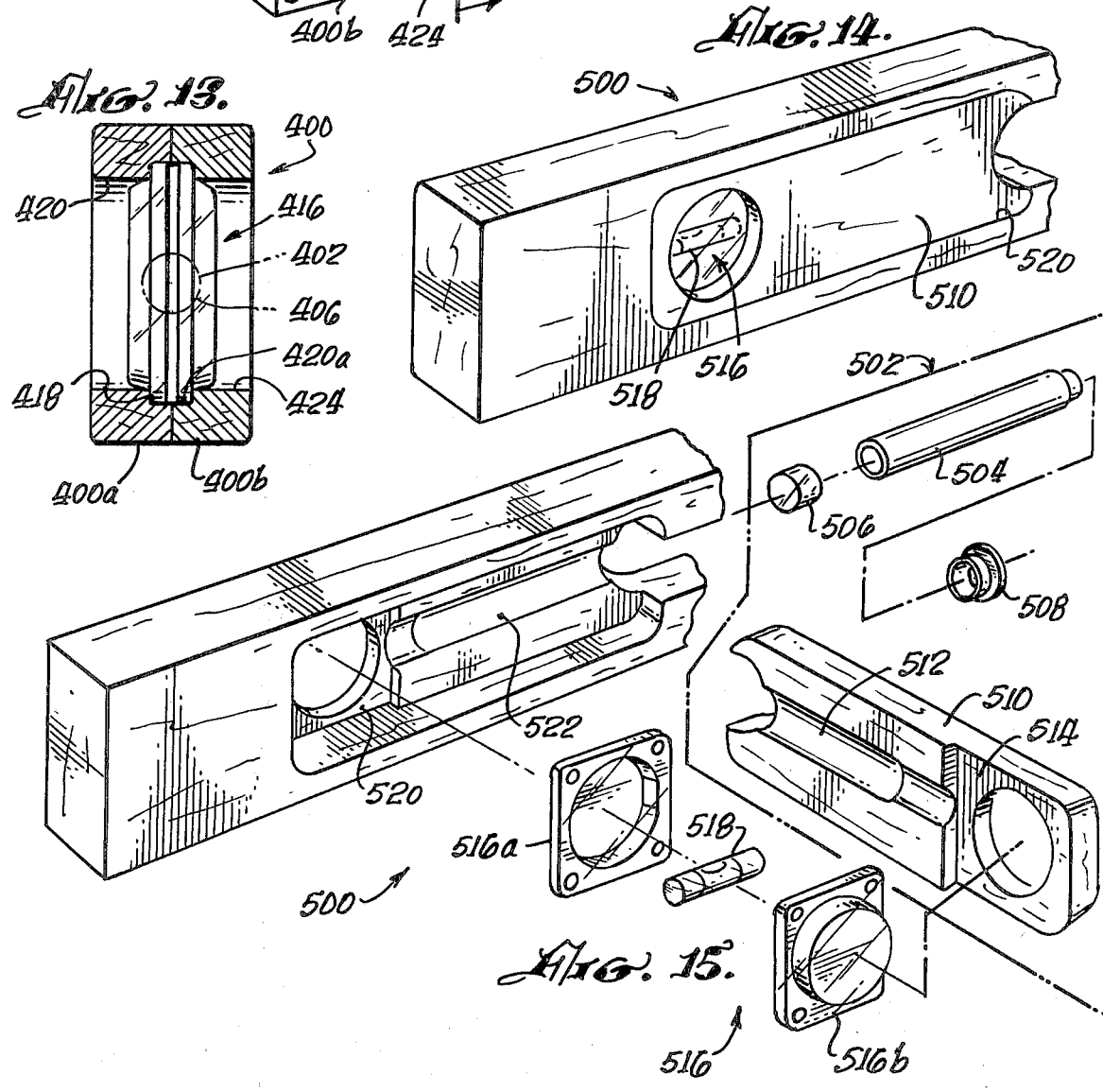

ILLUMINATING METHOD AND APPARATUS FOR CARPENTER'S OR MECHANIC'S LEVELS

CROSS REFERENCE TO RELATED PATENT APPLICATIONS

There are no patent applications filed by us related to the within application.

BACKGROUND OF THE INVENTION

1. Field of the Invention

This invention is in the general field of leveling devices, particularly levels used by carpenters and mechanics, and is more particularly related to a method and means for illumination of the leveling indicator in such manner that accurate use may be made in subdued shadowed, or unfavorable lighting conditions. The invention is further directed to such a method and means wherein the entire fluid used for the leveling medium is lighted. The invention is further directed to such a method and means wherein the illumination may be added to existing levels.

2. Description of the Prior Art

There have been many attempts to provide improved illumination for levels and the like. Many have been reduced to the status of U.S. Patents, and although a great number of such patents have been issued, still none of these inventions has been completely capable of solving the fundamental problem of the carpenter or the mechanic on the job using the level. None of the inventions, even though this is a crowded art, include the method of flooding the level fluid with light so that it literally "glows" in such a manner that there is no reflection to the eye of the user from which false readings may be obtained, and none of the present inventions comprise a simple, removable, yet integrally mounted lighting arrangement. Further, none of the inventions have provided a method and apparatus for the conversion of existing levels to an internally lighted level apparatus. In all of these respects, the present invention is completely unique.

THE SUMMARY OF THE INVENTION

We have been engaged in a study of carpenter's and mechanic's levels, and particularly in the problems of accurately using the same in many conditions of construction and the like, wherein the lighting is either inadequate, or natural area shadows or the like, prevent easy and accurate reading of the level while a workman is also attempting to move, or hold a structural member or the like, which is being aligned, plumbed, or leveled.

The most common method of ascertaining that a level is giving a proper reading is with the use of a flashlight. This requires a certain amount of acrobatics upon the part of the user, an assistant, or some other undesirable complication.

The devices which have been suggested for this purpose as being built into levels are all complex and expensive, and all of them result in light shining in various directions toward a level fluid. In general, such devices are too expensive to be practical and result in reflections and like and still cause problems.

We have now conceived and developed a totally new and simple method and apparatus for illuminating the leveling element in carpenter's and mechanic's levels. We have accomplished this by providing an opening in the body of the level intercommunicating with the leveling element and utilizing fibreoptics or the like, to convey the light in such manner that it penetrates into and seem to eminate from the fluid in the leveling element.

We have also provided a simple method and kit for converting existing levels to a new and improved and lighted level utilizing the theory and apparatus and method of our invention.

Thus, it is an object of this invention to provide a method for lighting carpenter's and mechanic's levels which is removably contained within the level.

Another object of this invention is to provide a method and apparatus for converting existing levels to a level of the type described.

Another object of this invention is to provide such an illumination for levels as has been described wherein the fluid itself is caused to appear to "glow" with conveyed light.

The foregoing and other objects and advantages of this invention will become apparent to those skilled in the art upon reading the description of a preferred embodiment which follows in conjunction with a review of the appended drawings.

BRIEF DESCRIPTION OF THE DRAWINGS

FIG. 7 is an exploded perspective view showing various components that are employed in the device of FIGS. 3, 4, and 5;

FIGS. 8 through 11 are side elevations of various alternate embodiments of the invention;

FIG. 12 is an exploded perspective of an alternate method of constructing one form of the illuminated level device;

FIG. 13 is a section taken on line 13—13 of FIG. 12 with the components in assembled condition;

FIG. 14 is a fragmentary perspective of yet another alternate embodiment of the invention; and FIG. 15 is an exploded view of the parts of FIG. 14.

THE DESCRIPTION OF A PREFERRED EMBODIMENT

Figures 1, 2:
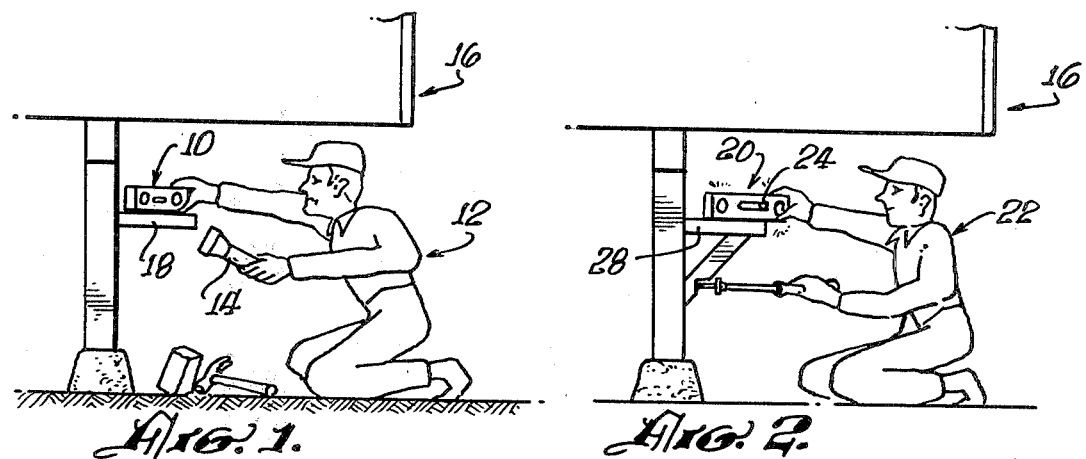
FIG. 1 is a view showing the prior art method of a workman reading a level indicating device in a darkened area.
FIG. 2 is a view similar to FIG. 1 but showing a workman using an illuminated level indicating device of the present invention and being able to use one hand to perform a job.

In FIG. 1 a prior art leveling device 10 is shown being held by one hand of a user, or workman, 12. The workman in this case is shown holding a flashlight 14 with his other hand while trying to view the level condition of a ledge 18 being prepared onto a structure 16.

In the illustration shown in FIG. 2, an illuminated leveling device 20 is shown being held by the right hand of a user 22. It can be seen that a finger operated flashlight device 24 provides illumination to the bubble level. In this case the ledge 28 being fastened onto the structure 26 can be done so by the operator holding a tool with his other free hand, instead of a flashlight, and thereby can fasten a support member by means of screwing it to the structure with a screw driver inserting a screw. Many other uses for such an illuminated leveling device can be easily found by those familiar in mechanical and structural work.

Figure 3:
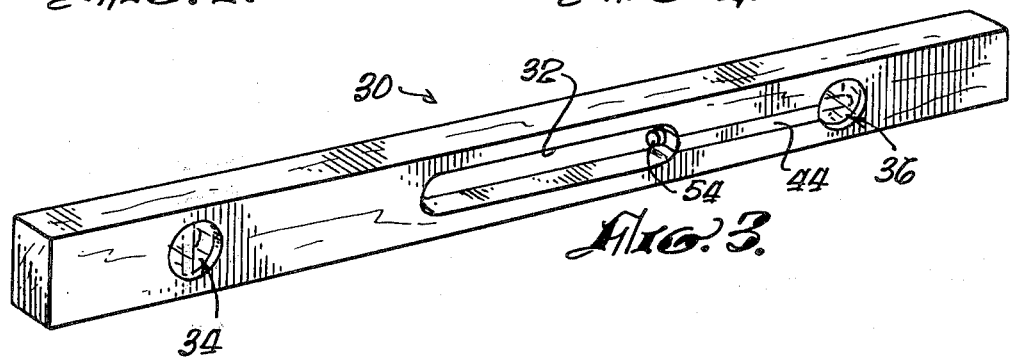
FIG. 3 is a perspective of an illuminated leveling device showing one method of construction.
Figure 4:
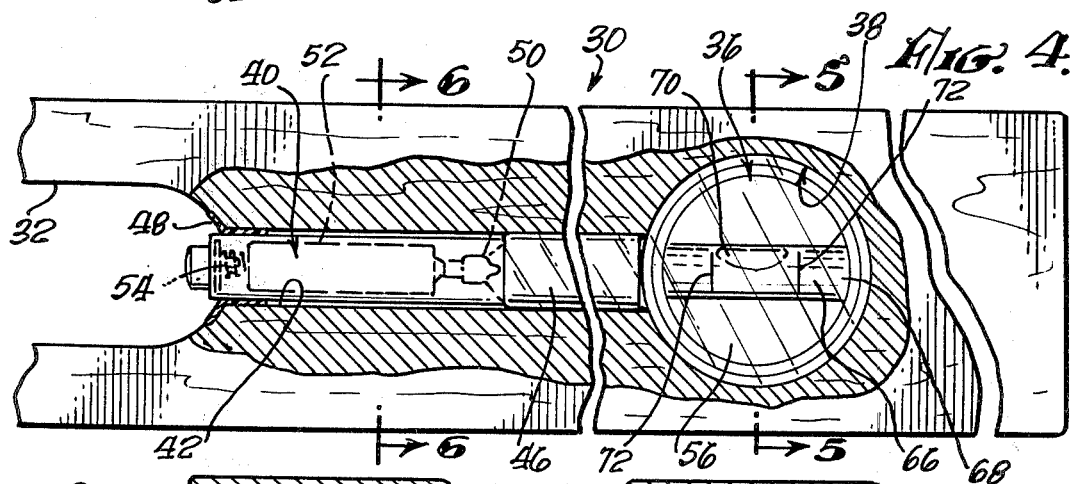
FIG. 4 is an enlarged elevation, partly in section of a portion of FIG. 3.

We have illustrated, in FIG. 3, a simplified manner in which the level illuminating device can be inserted into a conventional bubble type level. The overall device 30 having a hand opening 32 for holding the device 30, and level indication assemblies 34 and 36. It is to be understood that only the unit 36 will be shown in detail but it is also understood that the unit 34 can also be illuminated in a similar manner.

FIGS. 4 through 7 illustrate one manner in which a conventional level can be modified in order to present the illuminating apparatus into contact with the bubble level device 36. An opening 38 passing through the thickness of the level, generally constructed out of wood, and having certain configuration which will be described later. A miniatureized flashlight, 40, similar to a penlight, is placed into opening 42 within the wood level. Within the same opening 42 is inserted a light transmitting article such as, a piece of tubular plastic (acrylic, polycarbonate and the like, or fibreoptic material). This light transmitting element 46 is placed between the bulb of the flashlight and the level indicating bubble assembly. In order to secure a frictional fit within the opening 42, a grommet 48 may be inserted into the opening or may be attached to the lighting device or otherwise associated to secure a tight fit of the flashlight within the opening 42. Finally, a longitudinal wooden plug 44 is secured within a receiving slot in order to provide a closure for the opening which has been prepared to insert the illuminating device. The flashlight comprises conventional construction having a bulb 50, a battery 52, and a push button switch assembly 54. In order to replace the batteries it is a simple procedure to firmly take hold of the tip of the flashlight nearest the button and pulling the flashlight out against the resistance of the sleeve 48. Thus, it can be seen that an illuminated level structure of this type can have a replaceable light source for a long time.

The particular construction of the bubble-type leveling device 36, generally, has a central portion which is tapered to conform to the outer circumference of the bubble supporting housing 56. This housing encases the bubble mechanism by means of side plates 58 and 60. Recessed grooves in the outer portion 56 are indicated at 62 and 64. The tube 66 containing the liquid 68 is fabricated to form a bubble 70. The conventional indicating lines 72 are put onto the tube 66 in order to center the bubble 70. In order to more fully keep dirt and other foreign matter such as liquid from getting into the area of the bubble assembly, glass closure plates 74 and 76 are cemented at 78 to the larger outer diameter recesses 80 and 82 of the opening 36.

We have found that by adding a painted surface 84 into the area of the larger diameter openings aid in the illuminating of the whole leveling assembly. Paint of a fluorescent nature has proved to be helpful in providing more illumination.

Figures 5, 6:
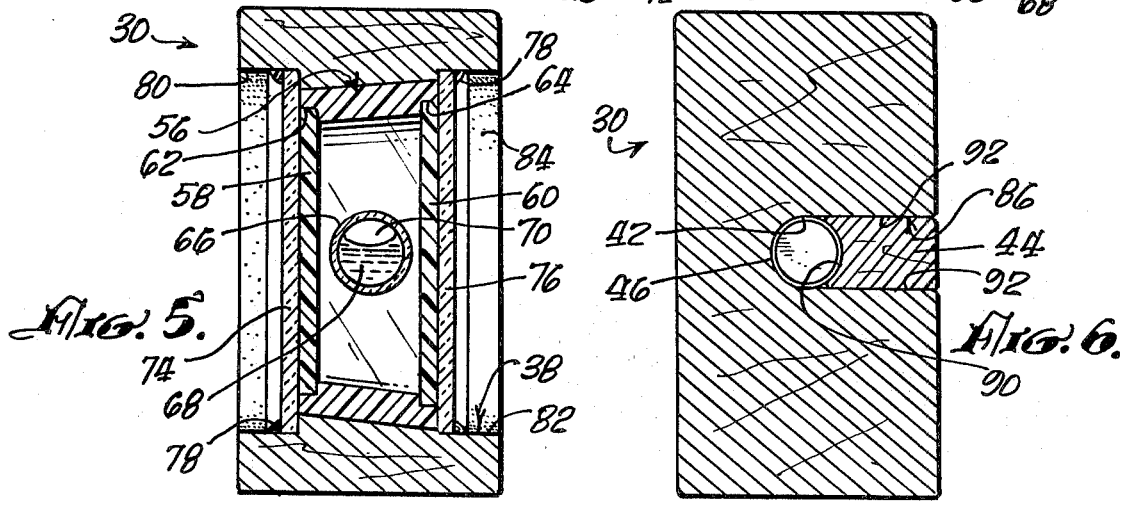
FIG. 5 is an enlarged section taken on line 5—5 of FIG. 4.
FIG. 6 is an enlarged section taken on line 6—6 of FIG. 4.

The opening 86, as shown in FIG. 6 receives the plug 44. By adding some adhesive to the top and bottom portions of the plug 44, it can be seen that the plug can be retained securely into the wood level body. The arcuate portion 90 of the slot 86 is of such a diameter as to receive the aforementioned light transmitting item 46 and the grommet 48. Straight portions 92 of the opening 86 receive the flat portions of the plug 44.

The light transmitting element 46 can be one of the presently known fibreoptic elements. FIGS. 8, 9, and 10 indicate how this fibreoptic element can be inserted into the level device of the invention and can transmit light from a flashlight to the bubble tube. The leveling device 100, as shown in FIG. 8, has a flashlight 102 inserted into an opening interconnecting the handle opening 104 and having a fibreoptic member 106 relaying the light from the flashlight to the bubble tube 108.

FIG. 9 indicates a view similar to FIG. 8 except that the bubble level is at a 45 degree angle to read such angles in both mechanics and carpenter's trades and the fibreoptic member 110 carries the light from the flashlight so that it directs light at the tube along its longitudinal length.

FIG. 10 shows another type of level 200 wherein the level indicating members 202 and 204 are such that curved tubular bubble members are located therein. In this case there are a pair of flashlight member 206 and 208 which direct the light along fibreoptic units 210 and 212 into the ends of the bubble tubes. FIG. 11 is a form similar to the one shown in FIGS. 2, through 7, and in this case, however, there are flashlights 302 and 304 directing light toward the level indicated in assemblies 306 and 308. The level, generally indicated by the reference numeral 300, is of the type wherein the light emitting from flashlight 302 will, in this case, enter the level indicating means 306 at right angles to the bubble. It is seen that the versatility of the penlight flashlight, along with its light transmitting members can be adapted to almost any type of leveling device.

FIG. 12 is an exploded perspective illustrating yet another alternate embodiment of the invention. In this case the level, generally indicated by the reference numeral 400, is formed of two segments of the level 400a and 400b. These two halves are fastened together by an adhesive or by fastening members in order to house a pair of flashlights 402 and 404. The light transmitting members 406 and 408 are inserted into a chamber 410 which is formed of segments 410a and 410b located in either half of the level housing. Grommets 412 and 414 are employed in the assembly as was the case in the earlier embodiment shown in FIGS. 2 through 7. A different shape of bubble level device as indicated by the reference numerals 416 and 418 are inserted into cutout rectangular depressions 418 and 420. A pair of similar depressions 418a and 420a which are located in the half portion of the level 400b. Circular openings 420, 422, 424 and 426 are located in the half portions 400a and 400b in order to allow the level assemblies 416 and 418 to be visible. The section of FIG. 13 brings about in more detail the way the leveling members are housed and fastened into the segments of the level.

The perspective of FIG. 14 and the exploded perspective of FIG. 15 show an alternate embodiment in which the level 500 can be modified to accept a kit which comprises elements of the invention. The kit indicated by the dotted outline 502 includes a flashlight 504, a light transmitting member 506, a grommet 508 and an outer panel segment 510. The panel member 510 is provided in the kit and has a semi-circular longitudinal opening 512 to accept the battery and light transmitting member. A notched out portion 514 accommodates one half of a level assembly 516. The bubble member 518 is confined within the housing 516 between its two members 516a and 516b. The assembly 516 fits into a fitted rectangular cutout 520 in the housing 500 and has a semi-circular longitudinal opening 522 which will mate and conform to the longitudinal 512. Instructions would be provided in the kit for the buyer to be able to shape the configuration in the level housing 500 to conform to the parts and the panel 510. The panel 510 can be finally fastened into the recess provided in the level 500 by an adhesive or by fastening members.

In this manner a buyer can procure the illuminating members necessary to install into an existing level of his choice and to be able to obtain the illumination necessary to perform the functions of this invention.

Various other uses for such an illuminated leveling device are obvious to those who are familiar in the art of using levels. As an example, travel trailers having leveling devices at each corner in order to stabilize the trailer after coming to rest for the night, would have little difficulty in being able to illuminate these levels after dark to keep the trailer in a level condition.

In various places within this specification reference has been made to wood, plastic, or other materials. It is understood that in each case where such a reference is made wood, plastic, or any other relatively rigid material which can be cut and drilled may be used.

While the embodiments of this invention shown and described are fully capable of achieving the objects and advantages desired, it is to be understood that such embodiments are for the sole purpose of illustration and not for the purpose of limitation.

We claim:

1. The method of illuminating a carpenter's or mechanic's level comprising: placing an illuminating device within the body of a level; and directing light from the illuminating device in such manner that it enters the leveling fluid through one end of a vial containing the fluid and travels through the fluid to the other end.

2. The method of claim 1 wherein the light from the illuminating device is directed to one end of a fibreoptic material and through the fibreoptic material through its other end and into one end of the level fluid vial.

3. The method as set forth in claim 2 wherein said directed light from one end of said fibreoptic material passes through the fibreoptic material, and out its other end, and then through one end of a level fluid vial which is on a different longitudinal axis than that of said illuminating device.

4. The method of claim 2 wherein prior to placing the illuminating device in the body of the level, the body of the level, adjacent the level fluid vial, is hollowed out from one side to accommodate an illuminating device and wherein the illuminating device is then placed within said hollowed portion.

5. The method of claim 4 wherein a cover is placed over the illuminating device and flush with the exterior surface of the body of the level after the illuminating device is in place.

* * * * *